US010985611B2

(12) United States Patent
Sagi et al.

(10) Patent No.: US 10,985,611 B2
(45) Date of Patent: Apr. 20, 2021

(54) SYSTEM AND METHOD FOR ESTIMATING GRID STRENGTH

(71) Applicant: General Electric Company, Schenectady, NY (US)

(72) Inventors: Deepak Raj Sagi, Bangalore (IN); Kasi Viswanadha Raju Gadiraju, Bangalore (IN); Deepak Aravind, Bangalore (IN); Vaidhya Nath Venkitanarayanan, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 86 days.

(21) Appl. No.: 16/379,933

(22) Filed: Apr. 10, 2019

(65) Prior Publication Data

US 2020/0328611 A1    Oct. 15, 2020

(51) Int. Cl.
*H02J 13/00* (2006.01)
*G05B 19/042* (2006.01)
*H02J 3/38* (2006.01)

(52) U.S. Cl.
CPC ........ *H02J 13/0006* (2013.01); *G05B 19/042* (2013.01); *H02J 3/386* (2013.01);
(Continued)

(58) Field of Classification Search
None
See application file for complete search history.

(56) References Cited

U.S. PATENT DOCUMENTS 8,174,150 B2   5/2012 Delmerico et al.
8,509,958 B2   8/2013 Larsen et al.
(Continued)

FOREIGN PATENT DOCUMENTS

CN   103036498 B    4/2013
DE   102017112944   12/2018
(Continued)

OTHER PUBLICATIONS

Huang et al., Voltage Control Challenges on Weak Grids with High Penetration of Wind Generation: ERCOT Experience, Conference: Power and Energy Society General Meeting 2012 IEEE, Research Gate, Jul. 2012, San Diego, CA, pp. 1-7.
(Continued)

*Primary Examiner* — Paul B Yanchus, III
(74) *Attorney, Agent, or Firm* — Dority & Manning, P.A.

(57) ABSTRACT

A method for estimating grid strength of a power grid connected to a renewable energy farm having a plurality of renewable energy power systems includes measuring, at least, a voltage, an active power, and a reactive power at a point of interconnection of the renewable energy farm to the power grid. The method also includes determining a sensitivity of the voltage to at least one of the active power or the reactive power at the point of interconnection. Further, the method includes determining the grid strength of the power grid as a function of the sensitivity of the voltage to at least one of the active power or the reactive power at the point of interconnection. In addition, the method includes dynamically determining at least one of an active power command or a reactive power command for the renewable energy farm at the point of interconnection based on the grid strength. Moreover, the method includes distributing at least one of the active power command or the reactive power command to individual controllers of the plurality of renewable energy power systems and a farm-level controller of the renewable energy farm.

18 Claims, 8 Drawing Sheets

(52) U.S. Cl.
CPC ............... *G05B 2219/2619* (2013.01); *G05B 2219/2639* (2013.01)

(56) References Cited

U.S. PATENT DOCUMENTS

| | | | |
|---|---|---|---|
| 8,780,595 | B2 | 7/2014 | Larsen |
| 8,823,192 | B2 | 9/2014 | Bech |
| 8,872,372 | B2 | 10/2014 | Larsen et al. |
| 8,942,856 | B2 | 1/2015 | Ren et al. |
| 9,093,928 | B2 | 7/2015 | Larsen |
| 9,190,845 | B2 | 11/2015 | Nelson et al. |
| 9,243,613 | B2 | 1/2016 | Yin |
| 2013/0079945 | A1 | 3/2013 | Achilles et al. |
| 2014/0021720 | A1 | 1/2014 | Nelson et al. |
| 2014/0043080 | A1 | 2/2014 | Larsen |
| 2014/0100705 | A1 | 4/2014 | Shi et al. |
| 2014/0159367 | A1 | 6/2014 | Yin |
| 2014/0312620 | A1 | 10/2014 | Korber et al. |
| 2015/0025860 | A1 | 1/2015 | Andresen et al. |
| 2015/0137518 | A1 | 5/2015 | Yin et al. |
| 2015/0148974 | A1* | 5/2015 | Diedrichs .............. G05B 15/02 700/287 |
| 2015/0369217 | A1* | 12/2015 | Gupta .................... H02H 3/006 290/44 |

FOREIGN PATENT DOCUMENTS

| | | |
|---|---|---|
| EP | 1841037 | 10/2007 |
| EP | 2175540 | 4/2010 |
| EP | 2236820 A2 | 10/2010 |
| EP | 2876768 A1 | 5/2015 |
| EP | 2963757 A1 | 1/2016 |
| WO | WO2015179139 A1 | 11/2015 |
| WO | WO2016062316 A1 | 4/2016 |
| WO | WO 2017223222 | 12/2017 |
| WO | WO2017223222 A1 | 12/2017 |
| WO | WO 2018115431 | 6/2018 |

OTHER PUBLICATIONS

Arif et al., Online Predictive Model Fitting Algorithm for Supply Inductance Estimation, Energy Conversion Congress and Exposition (ECCE) 2015 IEEE, Montreal, QC, Sep. 2015, pp. 1595-1602.
European Search Report, dated May 18, 2020 for EP Application No. 20168835.5.

* cited by examiner

SYSTEM AND METHOD FOR ESTIMATING GRID STRENGTH

FIELD

The present disclosure relates generally to renewable energy farms, such as wind farm, and more particular to a system and method for estimating grid strength of a power grid connected to a renewable energy farm.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

During operation, wind impacts the rotor blades and the blades transform wind energy into a mechanical rotational torque that rotatably drives a low-speed shaft. The low-speed shaft is configured to drive the gearbox that subsequently steps up the low rotational speed of the low-speed shaft to drive a high-speed shaft at an increased rotational speed. The high-speed shaft is generally rotatably coupled to a generator so as to rotatably drive a generator rotor. As such, a rotating magnetic field may be induced by the generator rotor and a voltage may be induced within a generator stator that is magnetically coupled to the generator rotor. The associated electrical power can be transmitted to a main transformer that is typically connected to a power grid via a grid breaker. Thus, the main transformer steps up the voltage amplitude of the electrical power such that the transformed electrical power may be further transmitted to the power grid.

In many wind turbines, the generator may be electrically coupled to a bi-directional power converter that includes a rotor-side converter joined to a line-side converter via a regulated DC link. Further, wind turbine power systems may include a variety of generator types, including but not limited to a doubly-fed induction generator (DFIG).

With increasing penetration of renewables, transmission upgrades lag generation addition leading to a situation where the grid capability (strength) worsens with increased capacity addition. From an operational standpoint, wind farms will be connected to grid with reduced short circuit capability (weaker grid) leading to challenges such as voltage stability and power evacuation capability in contingency situations. The short circuit ratio or grid strength is typically assessed offline during planning stage, while the true grid strength varies based on grid operating states (loading level, compensation sub-systems, line outages etc.).

In view of the foregoing, it would also be advantageous to provide an improved system and method for estimating grid strength in real time.

BRIEF DESCRIPTION

Aspects and advantages of the invention will be set forth in part in the following description, or may be obvious from the description, or may be learned through practice of the invention.

In one aspect, the present disclosure is directed to a method for estimating grid strength of a power grid connected to a renewable energy farm having a plurality of renewable energy power systems. The method includes measuring, at least, a voltage, an active power, and a reactive power at a point of interconnection of the renewable energy farm to the power grid. The method also includes determining a sensitivity of the voltage to at least one of the active power or the reactive power at the point of interconnection. Further, the method includes determining the grid strength of the power grid as a function of the sensitivity of the voltage to at least one of the active power or the reactive power at the point of interconnection. In addition, the method includes dynamically determining at least one of an active power command or a reactive power command for the renewable energy farm at the point of interconnection based on the grid strength. Moreover, the method includes distributing at least one of the active power command or the reactive power command to individual controllers of the plurality of renewable energy power systems and a farm-level controller of the renewable energy farm.

In one embodiment, the sensitivity of the voltage to at least one of the active power or the reactive power at the point of interconnection increases with a weakening of the power grid. Further, the weakening of the power grid corresponds to a decrease in a short circuit ratio of a generator of the renewable energy farm.

In another embodiment, the renewable energy farm may be closely coupled to neighboring renewable energy farms. In such embodiments, each of the neighboring renewable energy farms exhibits perturbations in power due to varying wind conditions and/or grid conditions. As such, the method further includes modeling the power grid as a linear time-invariant system.

In further embodiments, determining the grid strength of the power grid as a function of the sensitivity of the voltage to at least one of the active power or the reactive power at the point of interconnection may include performing a frequency domain transformation of each of the voltage, the active power, and the reactive power of the renewable energy farm. For example, in certain embodiments, the frequency domain transformation may include a Fast Fourier Transform.

In additional embodiments, determining the grid strength of the power grid as a function of the sensitivity of the voltage to at least one of the active power or the reactive power at the point of interconnection may include decoupling an impact of the active power on the voltage from an impact of the reactive power on the voltage. In several embodiments, the method may further include calculating a derivative of the active power with respect to the voltage and a derivative of the reactive power with respect to the voltage.

In certain embodiments, dynamically determining at least one of the active power command or the reactive power command for the renewable energy farm at the point of interconnection based on the grid strength may include dynamically determining the active power command and the reactive power command for the renewable energy farm at the point of interconnection as a function of the derivative of the active power with respect to the voltage and the derivative of the reactive power with respect to the voltage.

In yet another embodiment, the renewable energy farm may include at least one of a wind farm, a solar farm, and energy storage farm, or combinations thereof.

In another aspect, the present disclosure is directed to a method for estimating grid strength of a power grid connected to a renewable energy power system, such as a wind turbine. The method includes receiving, at least, a voltage from a point of interconnection of the renewable energy power system to the power grid. The method also includes determining a change in voltage in response to at least one of an active power injection or a reactive power injection at the point of interconnection. Further, the method includes determining the grid strength of the power grid as a function of the change in voltage in response to at least one of an active power injection or a reactive power injection at the point of interconnection. In addition, the method includes dynamically determining at least one of an active power command or a reactive power command for the renewable energy power system at the point of interconnection based on the grid strength. Moreover, the method includes distributing at least one of the active power command or the reactive power command to a controller of the renewable energy power system. It should also be understood that the method may further include any of the additional features and/or steps as described herein.

In yet another aspect, the present disclosure is directed to a system for estimating grid strength of a power grid connected to a wind farm having a plurality of wind turbines. The system includes one or more sensors communicatively coupled to a point of interconnection of the wind farm for measuring, at least, a voltage, an active power, and a reactive power. Further, the system includes a farm-level controller having at least one processor. The processor(s) is configured to perform a plurality of operations, including but not limited to determining a sensitivity of the voltage to at least one of the active power or the reactive power at the point of interconnection, determining the grid strength of the power grid as a function of the sensitivity of the voltage to at least one of the active power or the reactive power at the point of interconnection, and dynamically determining at least one of an active power command or a reactive power command for the wind farm at the point of interconnection based on the grid strength. Moreover, the method includes distributing at least one of the active power command or the reactive power command to individual controllers of the plurality of wind turbines. It should also be understood that the system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for estimating voltage sensitivity to real or reactive power at a point of interconnection, which is indicative of the grid strength. Further, the system and method of the present disclosure is capable of reliably estimating the voltage sensitivity even in situations where multiple farms are closely coupled. Prior art methods only work reliably in situations where a farm is electrically distant from other farms and hence will have limited application in preventing voltage control based interactions between closely coupled wind farms. As such, the present disclosure utilizes frequency domain methods to derive the voltage sensitivity to active and reactive power injection by a wind farm.

Accordingly, the present disclosure has many advantages not present in the prior art. For example, wind farms connected to weak grids (i.e. having a low short circuit ratio (SCR)) exhibit an inability to transfer active power and reactive power generated by its wind turbines. While transferring power into the weak grid, the POI and turbine terminal voltages may rise beyond designed limits and thus it is inevitable to curtail active power, reactive power, or both to bring voltages back within limits. Curtailment of active power decreases annual energy production (AEP) of the wind farm and hence loss in revenue for the customer. Voltage control performance of the wind farm is also affected by the grid strength especially where farms are clustered close together. Stable operation may require sacrificial trips on the wind turbines, which can be avoided by estimating the voltage sensitivity and tuning controls based on the real-time estimate as described herein.

Figure 1:
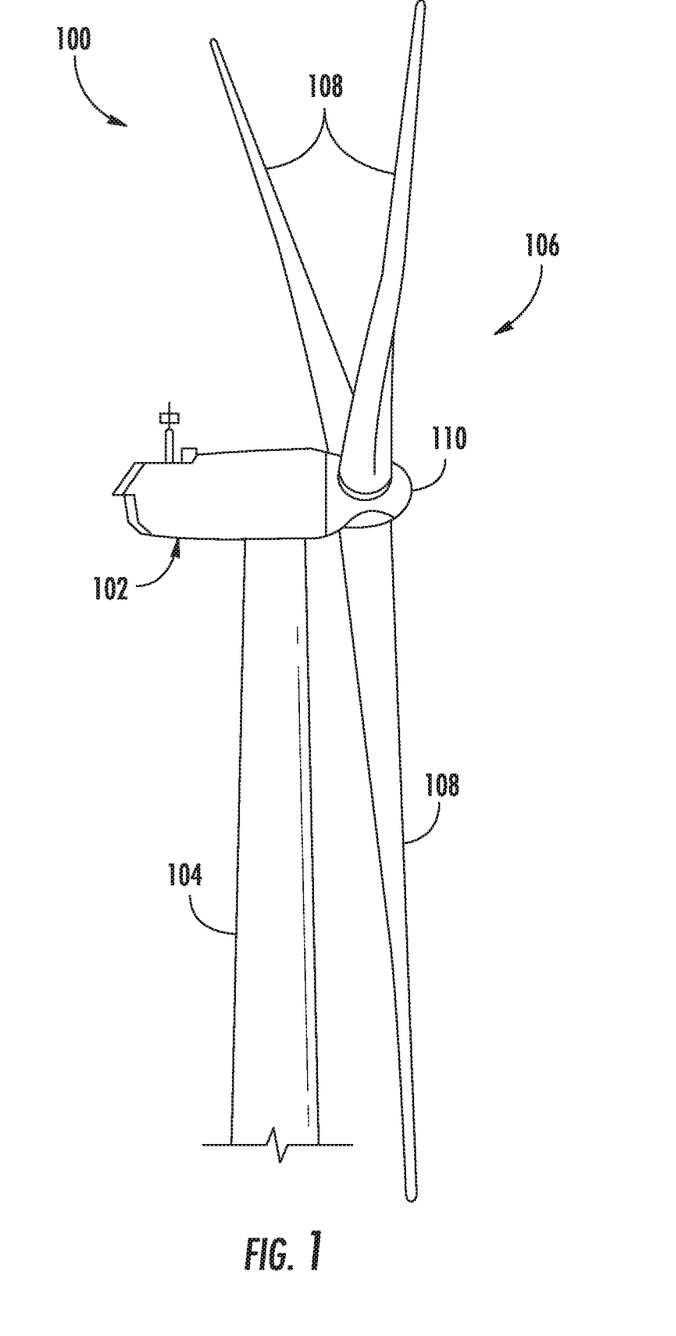
FIG. 1 illustrates a perspective view of a portion of one embodiment of a wind turbine according to the present disclosure.

Referring now to the drawings, FIG. 1 illustrates a perspective view of a portion of an exemplary wind turbine 100 according to the present disclosure that is configured to implement the method and apparatus as described herein. The wind turbine 100 includes a nacelle 102 that typically houses a generator (not shown). The nacelle 102 is mounted on a tower 104 having any suitable height that facilitates operation of wind turbine 100 as described herein. The wind turbine 100 also includes a rotor 106 that includes three blades 108 attached to a rotating hub 110. Alternatively, the wind turbine 100 may include any number of blades 108 that facilitates operation of the wind turbine 100 as described herein.

Figure 2:
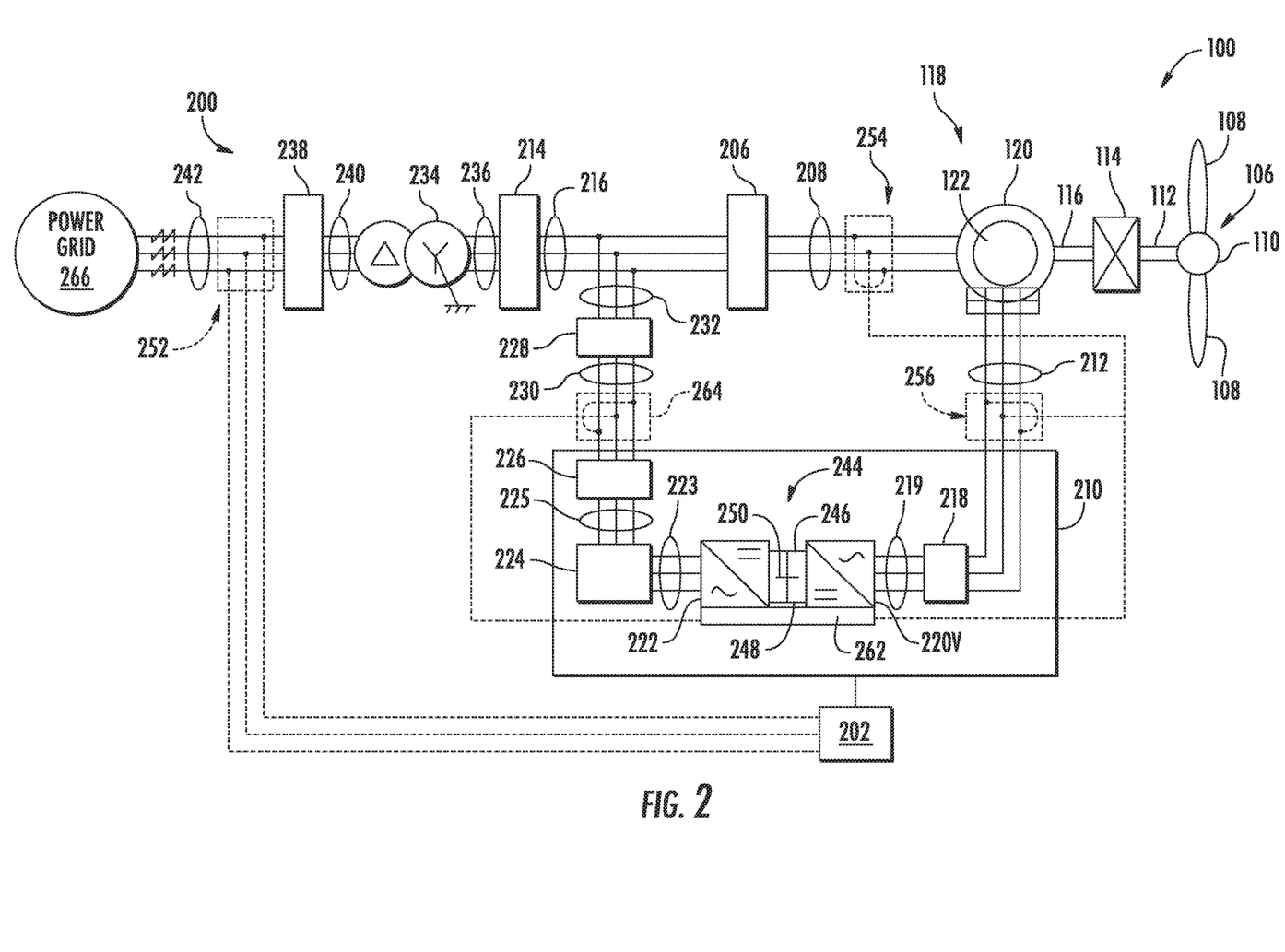
FIG. 2 illustrates a schematic view of one embodiment of an electrical and control system suitable for use with the wind turbine shown in FIG. 1.

Referring to FIG. 2, a schematic view of an exemplary electrical and control system 200 that may be used with the wind turbine 100 is illustrated. During operation, wind impacts the blades 108 and the blades 108 transform wind energy into a mechanical rotational torque that rotatably drives a low-speed shaft 112 via the hub 110. The low-speed shaft 112 is configured to drive a gearbox 114 that subsequently steps up the low rotational speed of the low-speed shaft 112 to drive a high-speed shaft 116 at an increased rotational speed. The high-speed shaft 116 is generally rotatably coupled to a generator 118 so as to rotatably drive a generator rotor 122. In one embodiment, the generator 118 may be a wound rotor, three-phase, double-fed induction (asynchronous) generator (DFIG) that includes a generator stator 120 magnetically coupled to a generator rotor 122. As such, a rotating magnetic field may be induced by the generator rotor 122 and a voltage may be induced within a generator stator 120 that is magnetically coupled to the generator rotor 122. In one embodiment, the generator 118 is configured to convert the rotational mechanical energy to a sinusoidal, three-phase alternating current (AC) electrical energy signal in the generator stator 120. The associated electrical power can be transmitted to a main transformer 234 via a stator bus 208, a stator synchronizing switch 206, a system bus 216, a main transformer circuit breaker 214, and a generator-side bus 236. The main transformer 234 steps up the voltage amplitude of the electrical power such that the transformed electrical power may be further transmitted to a power grid 266 via a breaker-side bus 240, a grid circuit breaker 238, and a grid bus 242.

The generator stator 120 may be electrically coupled to a stator synchronizing switch 206 via a stator bus 208. In one embodiment, to facilitate the DFIG configuration, the generator rotor 122 is electrically coupled to a bi-directional power conversion assembly 210 or power converter via a rotor bus 212. Alternatively, the generator rotor 122 may be electrically coupled to the rotor bus 212 via any other device that facilitates operation of electrical and control system 200 as described herein. In a further embodiment, the stator synchronizing switch 206 may be electrically coupled to a main transformer circuit breaker 214 via a system bus 216.

The power conversion assembly 210 may include a rotor filter 218 that is electrically coupled to the generator rotor 122 via the rotor bus 212. A rotor filter bus 219 electrically couples the rotor filter 218 to a rotor-side power converter 220. Further, the rotor-side power converter 220 may be electrically coupled to a line-side power converter 222 via a single direct current (DC) link 244. Alternatively, the rotor-side power converter 220 and the line-side power converter 222 may be electrically coupled via individual and separate DC links. In addition, as shown, the DC link 244 may include a positive rail 246, a negative rail 248, and at least one capacitor 250 coupled therebetween.

In addition, a line-side power converter bus 223 may electrically couple the line-side power converter 222 to a line filter 224. Also, a line bus 225 may electrically couple the line filter 224 to a line contactor 226. Moreover, the line contactor 226 may be electrically coupled to a conversion circuit breaker 228 via a conversion circuit breaker bus 230. In addition, the conversion circuit breaker 228 may be electrically coupled to the main transformer circuit breaker 214 via system bus 216 and a connection bus 232. The main transformer circuit breaker 214 may be electrically coupled to an electric power main transformer 234 via a generator-side bus 236. The main transformer 234 may be electrically coupled to a grid circuit breaker 238 via a breaker-side bus 240. The grid circuit breaker 238 may be connected to the electric power transmission and distribution grid via a grid bus 242.

During operation, alternating current (AC) power generated at the generator stator 120 by rotation of the rotor 106 is provided via a dual path to the grid bus 242. The dual paths are defined by the stator bus 208 and the rotor bus 212. On the rotor bus side 212, sinusoidal multi-phase (e.g. three-phase) AC power is provided to the power conversion assembly 210. The rotor-side power converter 220 converts the AC power provided from the rotor bus 212 into DC power and provides the DC power to the DC link 244. Switching elements (e.g. IGBTs) used in bridge circuits of the rotor side power converter 220 can be modulated to convert the AC power provided from the rotor bus 212 into DC power suitable for the DC link 244.

The line side converter 222 converts the DC power on the DC link 244 into AC output power suitable for the electrical grid bus 242. In particular, switching elements (e.g. IGBTs) used in bridge circuits of the line side power converter 222 can be modulated to convert the DC power on the DC link 244 into AC power on the line side bus 225. The AC power from the power conversion assembly 210 can be combined with the power from the stator 120 to provide multi-phase power (e.g. three-phase power) having a frequency maintained substantially at the frequency of the electrical grid bus 242 (e.g. 50 Hz/60 Hz). It should be understood that the rotor-side power converter 220 and the line-side power converter 222 may have any configuration using any switching devices that facilitate operation of electrical and control system 200 as described herein.

Further, the power conversion assembly 210 may be coupled in electronic data communication with a converter controller 262 and/or a turbine controller 202 configured to control the operation of the rotor-side power converter 220 and the line-side power converter 222. For example, during operation, the controller 202 may be configured to receive one or more voltage and/or electric current measurement signals from a first set of voltage and electric current sensors 252. Thus, the controller 202 may be configured to monitor and control at least some of the operational variables associated with the wind turbine 100 via the sensors 252. In the illustrated embodiment, each of the sensors 252 may be electrically coupled to each one of the three phases of grid bus 242. Alternatively, the sensors 252 may be electrically coupled to any portion of electrical and control system 200 that facilitates operation of electrical and control system 200 as described herein. In addition to the sensors described above, the sensors may also include a second set of voltage and electric current sensors 254, a third set of voltage and electric current sensors 256, a fourth set of voltage and electric current sensors 264 (all shown in FIG. 2), and/or any other suitable sensors. Further, the voltage and electric current sensors 252, 254, 256, 264 may be configured to measure, directly or indirectly, a power output of the wind turbine 100.

In addition, the converter controller 262 is configured to receive one or more voltage and electric current measurement signals. For example, as shown in the illustrated embodiment, the converter controller 262 receives voltage and electric current measurement signals from the second set of voltage and electric current sensors 254 coupled in electronic data communication with stator bus 208. The converter controller 262 may also receive the third and fourth set of voltage and electric current measurement signals from the third and fourth set of voltage and electric current sensors 256, 264. In addition, the converter controller 262 may be configured with any of the features described herein in regards to the turbine controller 202. Further, the converter controller 262 may be separate from or integral with the turbine controller 202.

Figure 3:
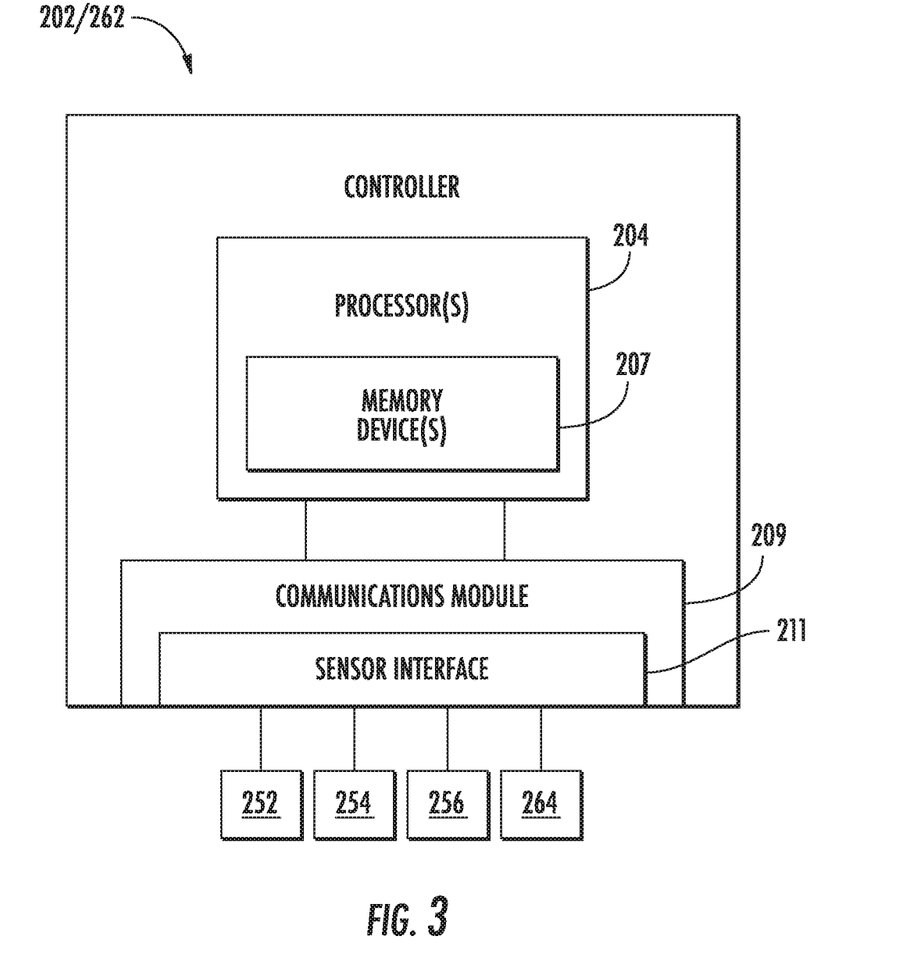
FIG. 3 illustrates a block diagram of one embodiment of suitable components that may be included in a controller according to the present disclosure.

Thus, the wind turbine controller 202, as well as the converter controller 262, is configured to control various components of the wind turbine 100. Accordingly, as shown particularly in FIG. 3, the controller(s) 202, 262 may include one or more processor(s) 204 and associated memory device(s) 207 configured to perform a variety of computer-implemented functions (e.g., performing the methods, steps, calculations and the like and storing relevant data as disclosed herein). Additionally, the controller 202 may also include a communications module 209 to facilitate communications between the controller 202 and the various components of the wind turbine 100, e.g. any of the components of FIG. 2. Further, the communications module 209 may include a sensor interface 211 (e.g., one or more analog-to-digital converters) to permit signals transmitted from one or more sensors to be converted into signals that can be understood and processed by the processors 204. It should be appreciated that the sensors (e.g. sensors 252, 254, 256, 264) may be communicatively coupled to the communications module 209 using any suitable means. For example, as shown in FIG. 3, the sensors 252, 254, 256, 264 may be coupled to the sensor interface 211 via a wired connection. However, in other embodiments, the sensors 252, 254, 256, 264 may be coupled to the sensor interface 211 via a wireless connection, such as by using any suitable wireless communications protocol known in the art. As such, the processor 204 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 204 is also configured to compute advanced control algorithms and communicate to a variety of Ethernet or serial-based protocols (Modbus, OPC, CAN, etc.). Additionally, the memory device(s) 207 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 207 may generally be configured to store suitable computer-readable instructions that, when implemented by the processor(s) 204, configure the controller 202 to perform the various functions as described herein.

It should also be understood that any number or type of sensors may be employed within the wind turbine 100 and at any location. For example, the sensors as described herein may be temperature sensors, Micro Inertial Measurement Units (MIMUs), strain gauges, accelerometers, pressure sensors, humidity sensors, speed sensors, strain gauges, accelerometers, airflow sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors.

Figure 4:
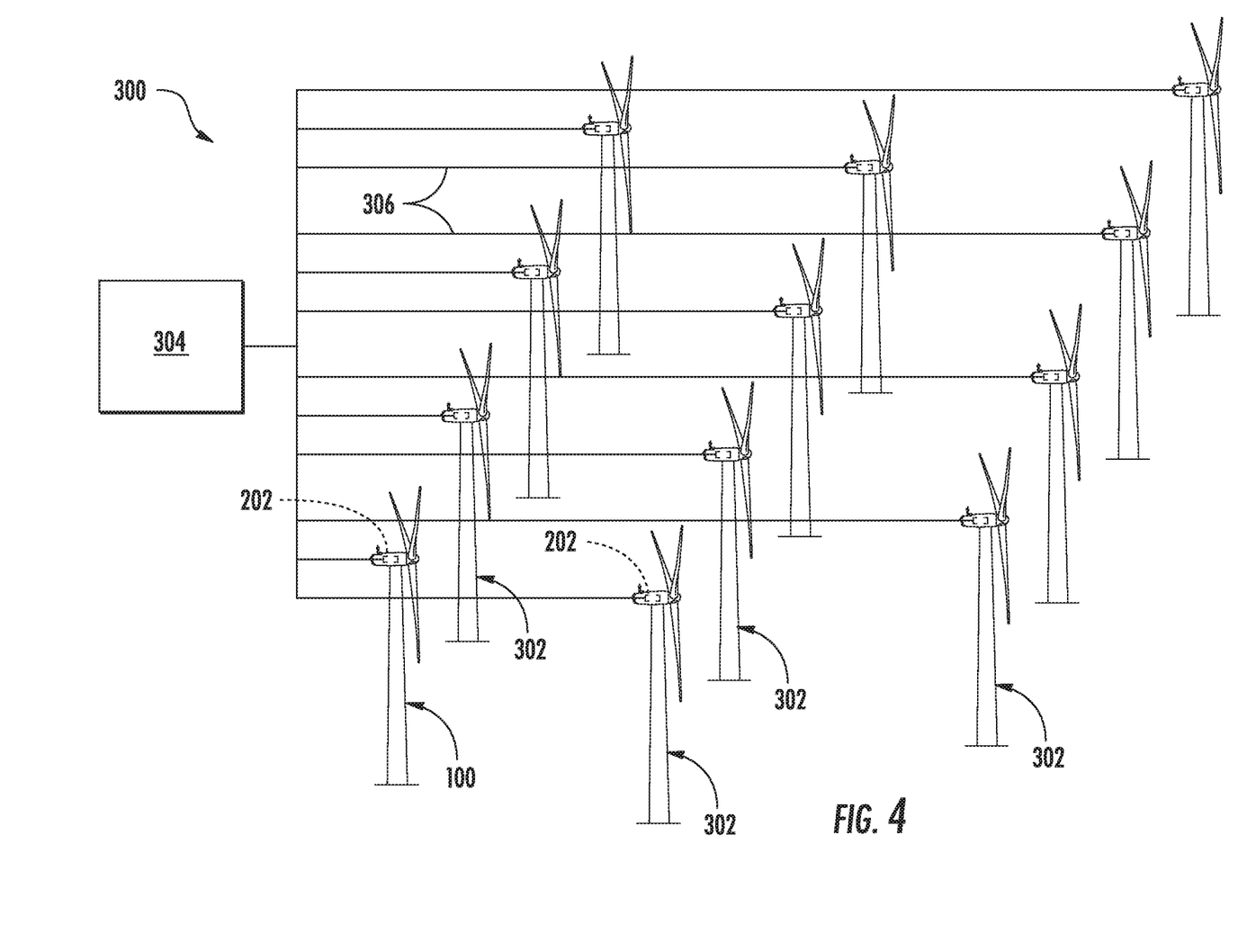
FIG. 4 illustrates a schematic diagram of one embodiment of a wind farm according to the present disclosure.

Referring now to FIG. 4, it should also be understood that the wind turbine 100 described herein may be part of a wind farm 300 according to present disclosure. As shown, the wind farm 300 may include a plurality of wind turbines 302, including the wind turbine 100 described above, and a farm-level controller 304. For example, as shown in the illustrated embodiment, the wind farm 300 includes twelve wind turbines, including wind turbine 100. However, in other embodiments, the wind farm 300 may include any other number of wind turbines, such as less than twelve wind turbines or greater than twelve wind turbines. In other embodiments, other sources of energy generation such as solar, chemical, geothermal, and/or thermal generation with or without energy storage devices may also be added to the wind farm 300. In one embodiment, the controller 202 of the wind turbine 100 may be communicatively coupled to the farm-level controller 304 through a wired connection, such as by connecting the farm-level controller 304 through suitable communicative links 306 or networks (e.g., a suitable cable). Alternatively, the controller 202 may be communicatively coupled to the farm-level controller 304 through a wireless connection, such as by using any suitable wireless communications protocol known in the art. Further, the farm-level controller 304 may be generally configured similar to the controller 202 for each of the individual wind turbines 302 within the wind farm 300.

Figure 5:
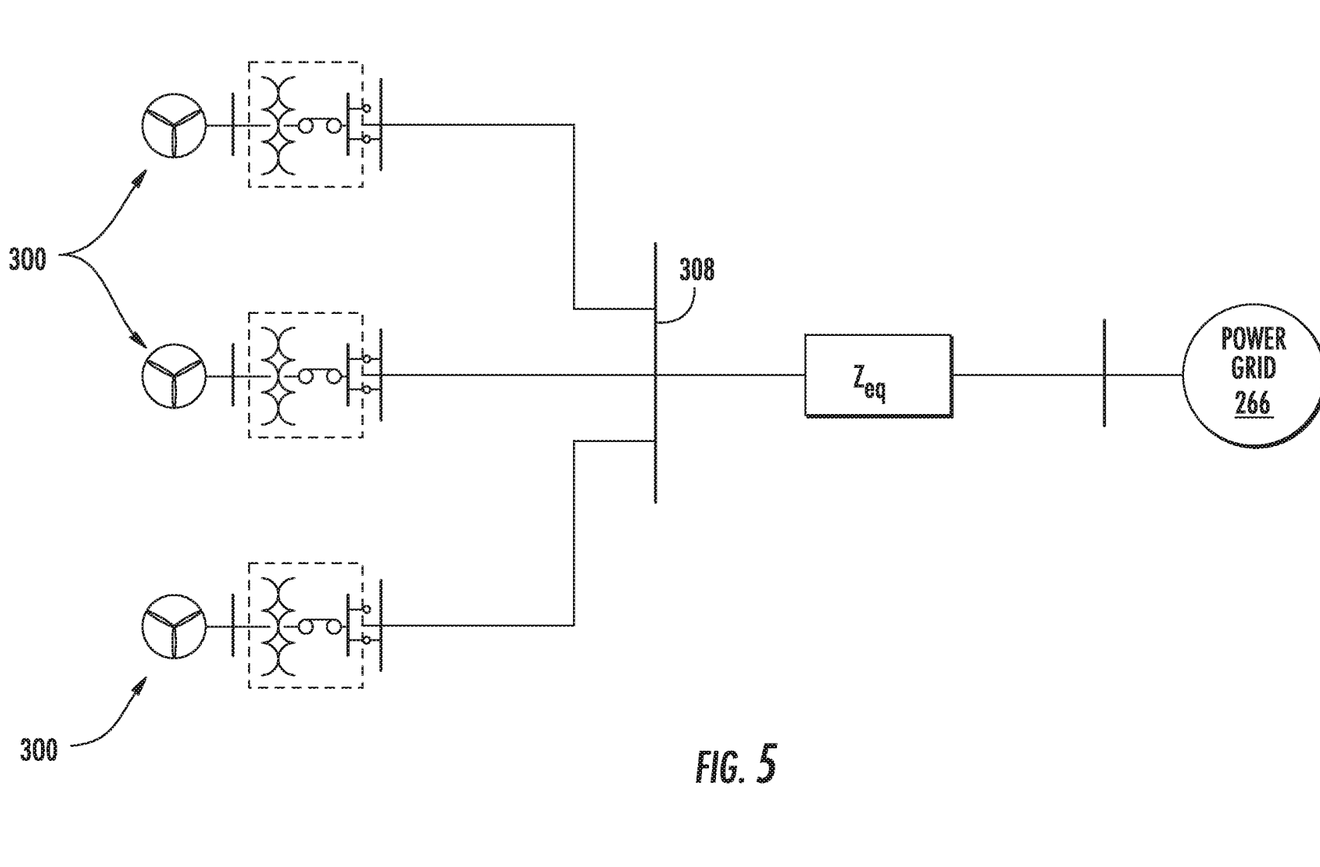
FIG. 5 illustrates a schematic diagram of one embodiment of a plurality of wind farms connected to a power grid at a point of interconnection according to the present disclosure.

In addition, as shown in FIG. 5, a plurality of the wind farms 300 may be connected to the power grid 266 at a point of interconnection (POI) 308. In such embodiments, as shown, the wind farm 300 may be closely coupled to other neighboring wind farms 300. In such embodiments, each of the neighboring renewable energy farms 300 exhibits perturbations in power due to varying wind conditions and/or grid conditions. As such, frequency domain methods can be used to decouple the perturbations in power from neighboring wind farms 300 to reduce the influence of the perturbations in power from the neighboring wind farms 300 on the locally measured voltage. Further, for a short-term time period, (e.g. a few seconds), the power grid 266 can be reasonably assumed to be a linear time-invariant system. Therefore, the controller(s) 202, 304 may be configured to model the power grid 266 as a linear time-invariant system, which evaluates the response of a linear and time-invariant system (e.g. the active or reactive power) to an arbitrary input signal (e.g. voltage). In such instances, the perturbations in power at certain frequencies will translate to changes in voltage at the same frequency. Methods for using frequency domain methods to decouple the perturbations in power from neighboring wind farms 300 and for estimating grid strength of the power grid 266 are described below with respect to FIGS. 6-8.

Figure 6:
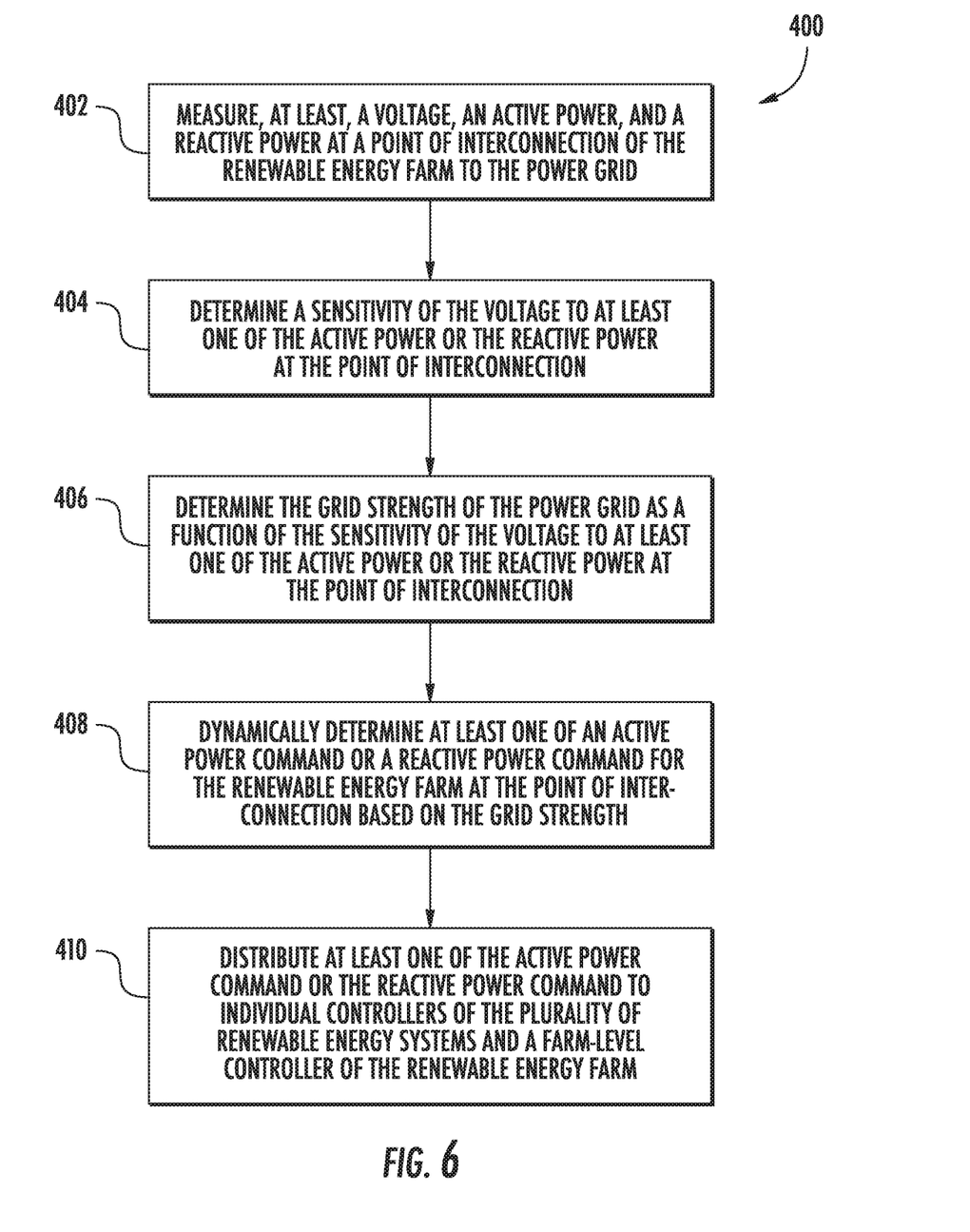
FIG. 6 illustrates a flow diagram of one embodiment of a method for estimating grid strength of a power grid connected to a wind farm according to the present disclosure.
Figure 7:
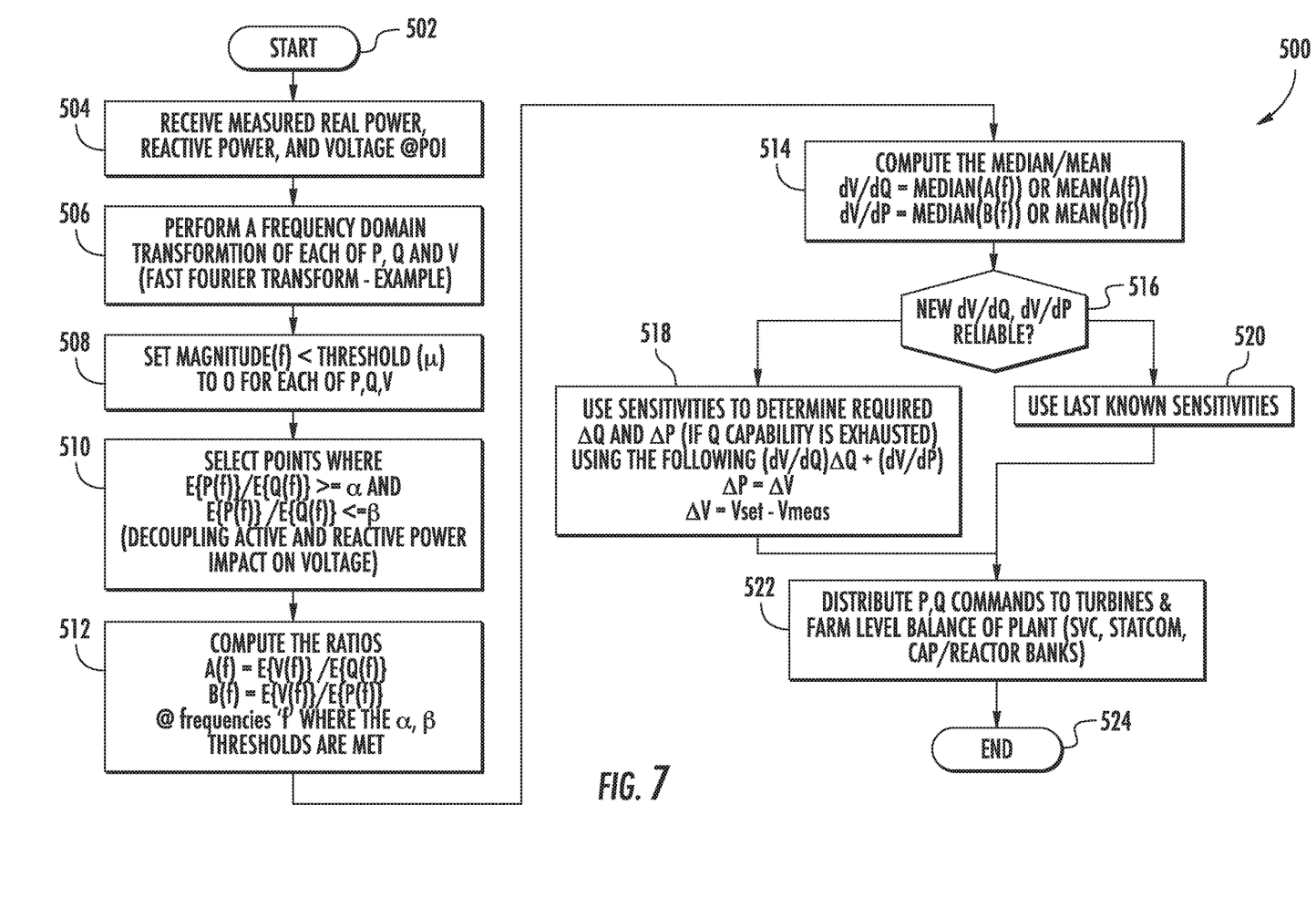
FIG. 7 illustrates a flow diagram of one embodiment of an algorithm 500 that may be implemented by a controller for determining the grid strength of the power grid according to the present disclosure.

Referring now to FIG. 6, a flow diagram of one embodiment of a method 400 for estimating grid strength of a power grid connected to a renewable energy farm is illustrated. The method 400 may be implemented to, for instance, with the wind turbine 100 and/or wind farm 300 discussed above with reference to FIGS. 1-6. FIG. 7 depicts steps performed in a particular order for purposes of illustration and discussion. Those of ordinary skill in the art, using the disclosures provided herein, will understand that various steps of the method 400 or any of the other methods disclosed herein may be adapted, modified, rearranged, performed simultaneously or modified in various ways without deviating from the scope of the present disclosure.

As shown at (402), the method 400 includes measuring, at least, a voltage, an active power, and a reactive power at the point of interconnection 308 of the wind farm 300 (also referred to herein as a renewable energy farm) to the power grid 266. As shown at (404), the method 400 includes determining a sensitivity of the voltage to at least one of the active power or the reactive power at the point of interconnection 308. In one embodiment, the sensitivity of the voltage to at least one of the active power or the reactive power at the point of interconnection increases with a weakening of the power grid 266. Further, the weakening of the power grid 266 corresponds to a decrease in a short circuit ratio of the generator 120 of the wind farm 300.

As shown at (406), the method 400 includes determining the grid strength of the power grid 266 as a function of the sensitivity of the voltage to the active power and/or the reactive power at the point of interconnection 308. More specifically, FIG. 7 illustrates a flow diagram of one embodiment of an algorithm 500 that may be implemented by the controller(s) 202, 304 for determining the grid strength of the power grid 266. As shown at (502), the algorithm 500 starts. As shown at (504), the algorithm 500 receives the measured real power, reactive power, and voltage from the POI 308. As shown at (506), the controller(s) 202, 304 are configured to determine the grid strength of the power grid 266 by performing a frequency domain transformation of each of the voltage (V), the active power (P), and the reactive power (Q) of the wind farm 300. For example, in certain embodiments, the frequency domain transformation may include a Fast Fourier Transform. As shown at (508), the algorithm 500 may include setting a magnitude (f) less than a threshold ($\mu$) to zero (0) for each of the voltage (V), the active power (P), and the reactive power (Q) of the wind farm 300. As shown at (510), the algorithm 500 may include selecting points herein $E\{P(f)\}/E\{Q(f)\}$ is greater than or equal to a and $E\{P(f)\}/E\{Q(f)\}$ is less than or equal to $\beta$, which has the effect of decoupling the active and reactive power impact on the voltage. As shown at (512), the algorithm 500 may include computing various ratios of voltage with respect to reactive and real power (e.g. $A(f)=E\{V(f)\}/E\{Q(f)$ and $B(f)=E\{V(f)\}/E\{P(f)\}$) at frequencies "f" where the $\alpha$, $\beta$ thresholds are met.

Figure 8:
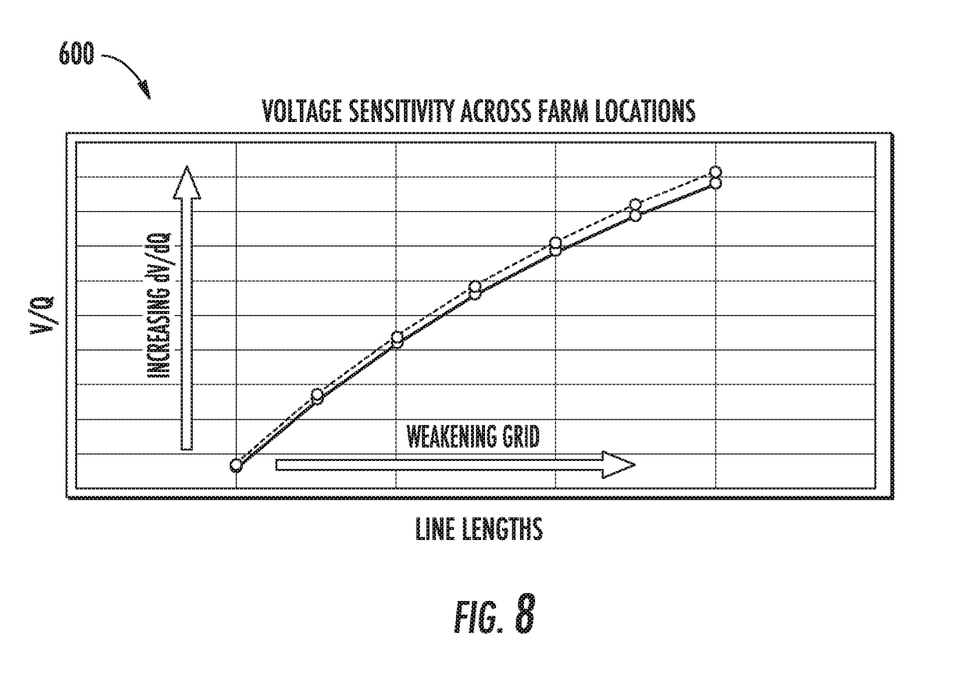
FIG. 8 illustrates a graph of one embodiment of the relationship of derivatives of voltage with respect to real and reactive power and line lengths (x-axis) for a plurality of wind farms according to the present disclosure.

As shown at (514), the algorithm 500 may also include computing the median/mean of the ratios from (512) to determine derivatives thereof (e.g. $dV/dQ$=median (A(f)) or mean (A(f)) and $dV/dP$=median (B(f)) or mean (B(f))). The derivatives (e.g. $dV/dQ$ and $dV/dP$) represent the sensitivity of the voltage to the active power and/or the reactive power at the point of interconnection 308. For example, as shown in FIG. 8, a graph 600 of one embodiment of the relationship of the derivatives (e.g. $dV/dQ$ and $dV/dP$) (y-axis) with respect to line lengths (x-axis) for a plurality of wind farms 300 is illustrated. As shown, increasing derivatives (e.g. $dV/dQ$ and $dV/dP$) correspond with a weakening grid/SCR. Therefore, by calculating the derivatives (e.g. $dV/dQ$ and $dV/dP$), the controller(s) 202, 304 can determine the grid strength. As shown at (516), the algorithm 500 is further configured to determine whether the derivatives (e.g. $dV/dQ$ and $dV/dP$) are reliable. If so, the algorithm 500 moves to (518) as further described below. If not, as shown at (520), the algorithm 500 utilizes the last known sensitivities.

Thus, referring back to FIG. 6, as shown at (408), the method 400 includes dynamically determining at least one of an active power command or a reactive power command for the wind farm 300 at the point of interconnection based on the grid strength. Thus, as shown at (410), the method 400 also includes distributing the active power command and/or the reactive power command to the individual controllers 202 of the plurality of wind turbines 302 and the farm-level controller 304 of the wind farm 300. For example, in certain embodiments, dynamically determining at least one of the active power command or the reactive power command for the wind farm 300 at the point of interconnection 308 based on the grid strength may include dynamically determining the active power command and the reactive power command for the wind farm 300 at the point of interconnection 308 as a function of the derivative of the active power with respect to the voltage and the derivative of the reactive power with respect to the voltage.

More specifically, as shown at (518) of FIG. 5, the controller(s) 202, 304 can use the sensitivities (e.g. the derivatives) to determine the required delta Q (e.g. $\Delta Q$) and delta P (e.g. $\Delta P$) (if Q capability is exhausted) using, for example, the Equations (1) and (2) below:

$$(dV/DQ)\Delta Q+(dV/DP)\Delta P=\Delta V$$

$$\Delta V = V\text{set} - V\text{meas}$$

Where $\Delta V$ is the change in voltage at the point of interconnection 308,

Vset is the voltage set point at the point of interconnection 308, and

Vmeas is the measured voltage at the point of interconnection 308.

Referring still to FIG. 7, at shown at (522), the algorithm 500 then includes distributing the active P and reactive Q power commands to the individual wind turbine controllers 202 and farm-level controller 304. As shown at (524), the algorithm 500 ends.

Although the various methods and algorithms described herein are generally explained with respect to farm-level control, it should also be understood that the same methods and algorithms can also be used to obtain sensitivities at the turbine level by utilizing turbine level measurements, although the estimates may be comparatively more noisy. In such instances, further processing can be completed to reduce noise, including, for example, filtering, etc.

Exemplary embodiments of a wind turbine, a control system for a wind turbine, and methods of controlling a wind turbine are described above in detail. The methods, wind turbine, and control system are not limited to the specific embodiments described herein, but rather, components of the wind turbine and/or the control system and/or steps of the methods may be utilized independently and separately from other components and/or steps described herein. For example, the control system and methods may also be used in combination with other wind turbine power systems and methods, and are not limited to practice with only the power system as described herein. Rather, the exemplary embodiment can be implemented and utilized in connection with many other wind turbine or power system applications, such as solar power systems and energy storage power systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for estimating grid strength of a power grid connected to a renewable energy farm having a plurality of renewable energy power systems, the method comprising:
   measuring, at least, a voltage, an active power, and a reactive power at a point of interconnection of the renewable energy farm to the power grid;
   determining a sensitivity of the voltage to at least one of the active power or the reactive power at the point of interconnection;
   determining the grid strength of the power grid as a function of the sensitivity of the voltage to at least one of the active power or the reactive power at the point of interconnection by performing a frequency domain transformation of each of the voltage, the active power, and the reactive power of the renewable energy farm;
   dynamically determining at least one of an active power command or a reactive power command for the renewable energy farm at the point of interconnection based on the grid strength; and,
   distributing at least one of the active power command or the reactive power command to individual controllers of the plurality of renewable energy systems and a farm-level controller of the renewable energy farm.

2. The method of claim 1, wherein the sensitivity of the voltage to at least one of the active power or the reactive power at the point of interconnection increases with a weakening of the power grid.

3. The method of claim 2, wherein the weakening of the power grid corresponds to a decrease in a short circuit ratio of a generator of the renewable energy farm.

4. The method of claim 1, wherein the renewable energy farm is coupled to neighboring renewable energy farms, each of the neighboring renewable energy farms exhibiting perturbations in power due to varying wind conditions and/or grid conditions, the method further comprising modeling the power grid as a linear time-invariant system.

5. The method of claim 1, wherein the frequency domain transformation comprises a Fast Fourier Transform.

6. The method of claim 5, wherein determining the grid strength of the power grid as a function of the sensitivity of the voltage to at least one of the active power or the reactive power at the point of interconnection further comprises:
   decoupling an impact of the active power on the voltage from an impact of the reactive power on the voltage.

7. The method of claim 6, further comprising calculating a derivative of the active power with respect to the voltage and a derivative of the reactive power with respect to the voltage.

8. The method of claim 7, wherein dynamically determining at least one of the active power command or the reactive power command for the renewable energy farm at the point of interconnection based on the grid strength further comprises:
   dynamically determining the active power command and the reactive power command for the renewable energy farm at the point of interconnection as a function of the derivative of the active power with respect to the voltage and the derivative of the reactive power with respect to the voltage.

9. The method of claim 1, wherein the renewable energy farm comprises at least one of a wind farm, a solar farm, and energy storage farm, or combinations thereof.

10. A method for estimating grid strength of a power grid connected to a renewable energy power system, the method comprising:
    receiving, at least, a voltage from a point of interconnection of the renewable energy power system to the power grid;
    determining a change in voltage in response to at least one of an active power injection or a reactive power injection at the point of interconnection;
    determining the grid strength of the power grid as a function of the change in voltage in response to at least one of an active power injection or a reactive power injection at the point of interconnection by performing a frequency domain transformation of each of the voltage, the active power, and the reactive power of the renewable energy farm;
    dynamically determining at least one of an active power command or a reactive power command for the renewable energy power system at the point of interconnection based on the grid strength; and,
    distributing at least one of the active power command or the reactive power command to a controller of the renewable energy power system.

11. A system for estimating grid strength of a power grid connected to a wind farm having a plurality of renewable energy power systems, the system comprising:
    one or more sensors communicatively coupled to a point of interconnection of the wind farm for measuring, at least, a voltage, an active power, and a reactive power;
    a farm-level controller comprising at least one processor, the processor configured to perform a plurality of operations, the plurality of operations comprising:
      determining a sensitivity of the voltage to at least one of the active power or the reactive power at the point of interconnection;
      determining the grid strength of the power grid as a function of the sensitivity of the voltage to at least one of the active power or the reactive power at the point of interconnection by performing a frequency domain transformation of each of the voltage, the active power, and the reactive power of the renewable energy farm;
      dynamically determining at least one of an active power command or a reactive power command for the wind farm at the point of interconnection based on the grid strength; and,
      distributing at least one of the active power command or the reactive power command to individual controllers of the plurality of wind turbines.

12. The system of claim 11, wherein the sensitivity of the voltage to at least one of the active power or the reactive power at the point of interconnection increases with a weakening of the power grid.

13. The system of claim 11, wherein a weakening of the power grid corresponds to a decrease in a short circuit ratio of a generator of the wind farm.

14. The system of claim 11, wherein the wind farm is coupled to neighboring wind farms, each of the neighboring wind farms exhibiting perturbations in power due to varying wind conditions and/or grid conditions, the method further comprising modeling the power grid as a linear time-invariant system.

15. The system of claim 11, wherein the frequency domain transformation comprises a Fast Fourier Transform.

16. The system of claim 15, wherein determining the grid strength of the power grid as a function of the sensitivity of the voltage to at least one of the active power or the reactive power at the point of interconnection further comprises:
   decoupling an impact of the active power on the voltage from an impact of the reactive power on the voltage.

17. The system of claim 16, further comprising calculating a derivative of the active power with respect to the voltage and a derivative of the reactive power with respect to the voltage.

18. The system of claim 17, wherein dynamically determining at least one of the active power command or the reactive power command for the wind farm at the point of interconnection based on the grid strength further comprises:
   dynamically determining the active power command and the reactive power command for the wind farm at the point of interconnection as a function of the derivative of the active power with respect to the voltage and the derivative of the reactive power with respect to the voltage.

* * * * *